United States Patent Office 3,126,355
Patented Mar. 24, 1964

3,126,355
PROCESS OF PREPARING DRY POWDERED VINYL ESTER POLYMER COMPOSITIONS AND RESULTING PRODUCT
Vera M. Birten, Bernard M. Brill, and Herbert Terry, Springfield, Mass., assignors to Shawinigan Resins Corporation, Springfield, Mass., a corporation of Massachusetts
No Drawing. Filed Mar. 16, 1959, Ser. No. 799,478
7 Claims. (Cl. 260—8)

This invention relates to dry powdered compositions based on vinyl ester polymers as a binder.

More specifically the invention relates to compositions of this type which can be readily dispersed in water to form smooth homogeneous dispersions from which hard, abrasion resistant, flexible water-resistant films can be formed.

The compositions of the present invention have particular suitability as dry forms of paints, caulking compounds, spackling compounds and texture finishes.

The advantages of dry polyvinyl acetate compositions for coating and analogous purposes have been recognized. See for example Morrison U.S. Patent 2,800,463, July 23, 1957. Such compositions eliminate problems inherent in aqueous dispersions, namely, that of keeping them stable under varying conditions of temperature and over long periods of time, and of transporting unnecessary bulk in getting the product from the manufacturer to the distributor and to the consumer.

Nevertheless, difficulties have been experienced in formulating dry compositions which can be readily dispersed in water to form a composition from which water-resistant flexible films can be laid down. The greatest difficulties have been experienced in formulating dry free-flowing powders where it is necessary to incorporate a plasticizer and/or coalescing agent for the vinyl ester resinous binder in order to produce films having the above-mentioned desired properties. The reason for this difficulty is that most of the commercially available coalescing agents and plasticizers which best aid in imparting the desirable properties are organic liquids. The mere mixing together of powdered polyvinyl esters, even that resulting from drying emulsions in accordance with the Morrison patent with such other constituents of the composition, will not result in a composition which can be reformulated in aqueous form as a satisfactory product.

The resulting mixture would become badly caked in storage and even after formulation into the aqueous dispersion with the aid of efficient mechanical agitation, portions of the mixture would remain sufficiently agglomerated so that films cast therefrom would have such inferior properties as reduced abrasion resistance, flexibility and hardness.

Although the compositions of the present invention have been termed "mixtures" for ease of reference and common understanding, there is cooperation between various constituents of the dry powder. For example, the liquid plasticizers and/or coalescing agents become absorbed or adsorbed in the pigment. Furthermore, the dispersing agent which constitutes a portion of the emulsion form of the dried vinyl ester polymer is generally bonded directly to the individual polymer particles. In addition, when the dry powder compositions are dispersed in water, there is further cooperation between all of the constituents both in the liquid state as well as the subsequent dried film the particular combination of constituents rendering the dry compositions capable of being reconstituted with water to a solids content of between 30 and 70% so as to form a stable dispersion being capable of being laid down as a film which is water-resistant at temperatures up to at least 150° F.

The applicants' dry compositions are characterized by the ease of redispersion to obtain homogeneous stable dispersions, simply by hand mixing, as distinct from the critical limitations of the usual formulation methods whereby pigments and other solid constituents must necessarily first be combined with dispersing agents before addition to the liquid polymer binder emulsion to guarantee a stable, homogeneous emulsion. The formulation process for a pigmented polymer dispersion having these properties by the usual techniques involves a critical method of addition as well as a critical selection of constituents, as evidenced by the almost universal use of stabilizing agents in the formulation. In contrast the dry compositions of the present invention provide stable dispersions without absolute need for stabilizers, or thickeners as they are sometimes called. Films produced from the aqueous dispersions obtained from the dry compositions of the present invention, in addition to having the improved properties, will not crack or shrink in normal service.

The applicants have now found that certain constituents properly selected and brought together in critical amounts and in a particular manner can be made to form a satisfactory dry mixture redispersible in water to form a film forming composition. Compositions according to the invention essentially contain a resinous binder in powder form, an organic liquid plasticizer and/or coalescing agent for the polyvinyl ester, a dispersing agent and certain water dispersible inorganic particulate solids.

The resinous binder used is a dried vinyl ester polymer, preferably a dry powder form of the homopolymer of vinyl acetate and/or the dry form of certain internally plasticized polymers of vinyl acetate as hereinafter disclosed. Where an internally plasticized resinous binder is selected there is generally no need for the incorporation of a plasticizer to obtain a high degree of flexibility and water resistance since the binder itself already possesses such properties. On the other hand, the need for a plasticizing or coalescing agent generally remains so that films cast from the dispersions will flow smoothly and quickly to provide a substantially continuous coating before the water evaporates when applied to surfaces even where a form of internally plasticized resinous binder is used.

The inorganic water dispersible particulate solids which are useful in the practice of the present invention can be selected from the general class of paint pigments and extenders therefor, cementitious materials and texturing agents, dependent upon the particular application for the aqueous dispersion. Numerous other agents may be incorporated into the above compositions in addition to the essential constituents described above for the chief purpose of modifying the application properties of the aqueous dispersion and most notable of which are setting-time retarders for the cementitious materials and thickeners. Such modifiers are not required, however, to provide the useful properties heretofore described for films cast from the dispersions.

The preferred manner in which the components of the applicants' compositions can be brought together is as follows: The organic liquid plasticizer and/or coalescing agent for example, is mixed with the inorganic particulate solid. This is preferably done by mixing the latter as in a dough-type mixer, the dispersing agent being slowly mixed in until a uniform state has been reached. Then, the dried vinyl ester polymer powder is slowly sifted into this batch. When this mixture is complete, it is screened to remove any resinous binder which may have been agglomerated by the organic liquid. To prevent agglomeration of the mixture, the organic liquid must be incorporated in with the inorganic particulate solid before contact with the resinous binder.

Substantially complete freedom from agglomeration may be accomplished if the constituents are mixed in the manner prescribed and the entire composition thoroughly mixed in a commercial dough-type mixer for periods of an hour or more. Where the mixing operation in the dough mixer is continued for periods substantially less than an hour, for example 10 minutes, there may be agglomeration of as much as 5% of the total. It is such agglomerated amounts that can be removed by screening. It is further obvious that the amount of agglomeration will be a function of the batch size, the ratio of batch to the particular size mixer used, and other variables; hence, any limitaiton as to the time for mixing must take cognizance of such consideration. On the other hand, if the mixing process is not followed according to the directions given, the agglomeration will be such that no amount of screening will help.

The following are useful ranges of proportions. The proportions are by weight on the total composition unless otherwise stated. Dried vinyl ester polymer at 100 parts; inorganic particulate solids from about 40 parts to about 1000 parts, up to 30% of the weight of the inorganic particulate solid of the organic liquid plasticizer and/or coalescing agent; dispersing agent from about 0.1 to about 5.0 parts and thickener from 0-25 parts.

The compositions are dispersible in water at concentrations from about 30% to about 70% by weight of solids to form a stable aqueous dispersion and from which there can be laid down a film which after drying at ordinary temperatures is non-redispersible, flexible and adhesive to normal substrates.

BINDER

As a binder in these compositions there may be employed any dried vinyl ester polymer such as made according to the Morrison patent, which powder is redispersible on mixing with water alone to form a stable emulsion.

Useful homopolymer vinyl acetate compositions may be selected from the class of free filming types as well as from the non-free filming class of polyvinyl ester dried powders. Each powder particle of the dried emulsion form of the polyvinyl ester comprises generally a plurality of discrete resin particles, each resin particle having an average size range of .05 to 8 microns diameter and having a dispersing agent generally bonded thereto. The size of the powder particle ranges from an average diameter of .05 micron to 50 microns.

The preparation of polyvinyl acetate homopolymer emulsions from which the dried powder can be obtained is well known, as for example the emulsions shown in Example 3, U.S.P. 2,614,088, Example 15, U.S.P. 2,508,341, and Example B, 2,444,396 are suitable.

Useful internally plasticized polymers of vinyl acetate include copolymers of vinyl acetate with dibutyl maleate, diethyl fumarate, dioctyl maleate, vinyl stearate, ethyl acrylate and the like. The physical characteristics of the dried powder having the copolymer compositions is approximately the same as that disclosed for the homopolymer compositions. Likewise the methods for the preparation of the copolymer emulsions from which the dried powder can be obtained is well known, as for example, the preparation of the copolymer of vinyl acetate with dibutyl maleate as taught in Sample D, U.S.P. 2,833,737.

PLASTICIZERS AND COALESCING AGENTS

As plasticizers there may be employed any of the liquid plasticizers for vinyl ester polymer emulsions, for example such organic compounds as phthalate esters, phosphate esters, chlorinated biphenyls, and citrate esters. Furthermore, useful organic compounds also include polymeric materials as for example, water dispersible liquid polyesters. In general, the suitable plasticizers may be selected from the class of water miscible organic plasticizer materials which are compatible with vinyl ester polymer emulsions. Dibutyl phthalate is the preferred plasticizer primarily because of its relatively lower viscosity compared to other suitable plasticizers which lower viscosity aids in the case of incorporation of the plasticizer into the inert particulate solid. The plasticizer promotes flexibility of the dried film. It is not required that the plasticizer also soften the film or keep it tacky after air-drying.

Coalescing agents are well known in the art. They are also known by the terms solvents, filming agents and conditioning agents. The coalescing agents that are useful in the practice of the present invention are water dispersible organic liquids which are compatible with aqueous polyvinyl ester emulsions. The preferred class of coalescing agents are water-soluble and can be selected from the class of glycols, glycol ethers and esters of glycol ethers including hexylene glycol, ethylene glycol, monoethyl ether of diethylene glycol (sold under the trade name "Carbitol"), ethylene glycol monoethyl ether (sold under the trade name "Cellosolve"), propylene glycol, acetic acid ester of "Cellosolve," butyl "Carbitol" acetate and the like. The class of suitable coalescing agents can be selected from the general class of solvents for the resinous binder and can be more specifically characterized as those which are compatible with aqueous emulsions of the resinous binder so that the resin particles are not precipitated by addition of the solvent. Suitable coalescing agents may be further characterized as those which are sufficiently non-volatile so as to remain present in the dry powder mixture during the entire storage period and for a reasonable period after redispersion of the mixture and casting of the film. Thus it is contemplated that such organic liquid solvents as aromatic hydrocarbons including xylene and toluene, as well as other liquid organic compounds having the specified properties listed are within the scope of this invention.

INORGANIC PARTICULATE SOLIDS

The inorganic particulate solids employed in the dry powdered compositions serve two main uses as regards final properties of films produced therefrom. The pigments, pigment extenders and texturing agents remain as inert agents in the film composition serving essentially only as opacifiers, colorants, body agents, and the like.

The cementitious materials, however, undergo the usual reaction with water so that the reaction products impart increased strength to the film as well as function as a low cost binder. The term "cementitious materials" is used in its broadest sense in that it includes not only the sand component generally incorported in cement compositions but includes inorganic plaster materials, as for example plaster of Paris, as will be illustrated in the succeeding examples. Selection of an inert type of inorganic particulate solid as compared to the cementitious material type of additive can be best determined on the basis of the particular end-use of the film. This is not to say, however, that certain inorganic compounds, as for example, sand, might not be a suitable material in both type groups. Sand is both a preferred texturing agent as well as a cementitious material because of its desirable particle size and obvious economic benefit.

Generally speaking, any of the normal pigments for vinyl ester polymer dispersion paints may be employed. Preferably, pigments should be selected which are most readily dispersed with the help of a dispersing agent. For paints it is usual to employ both prime pigments and extenders.

The useful pigments are characterized as being dispersible but not soluble in water and generally not chemically reactive with the other constituents in the composition. Certain reactive pigments are suitable where there is a very limited reactivity. Such reactivity can be limited to those useful to control pH. The optimum particle size of the pigment is .4 micron average diameter. When the pigment particle size exceeds approximately a 2 micron diameter, there is difficulty in dispersing this pigment. The useful extenders may be characterized as having the same physical and chemical properties as the pigment with the exception that they possess low hiding power. Their chief advantage is an economic one; namely, that of raising pigment-volume-concentration (P.V.C.) without increasing the cost substantially. Although the compositions of the invention can tolerate a certain amount of reactivity of the pigment, suitable extenders are essentially those which are non-reactive.

Suitable prime pigments are for example rutile titanium dioxides, particularly those sold under trademark names "Titanox RA–50," "R–750," "Zopaque R–33," "Unitane OR250," "R–710." Extended titanium dioxide, particularly those sold under trademark names "Titanox RCHT–X," "Titanox C–50."

Extenders which may be employed include the following: calcium silicates, particularly "Wollastonite P–4"; clays, particularly those sold under trademark names "ASP400," "Hydrite"; micas, particularly water-ground mica, sold under the proprietary name "Alsibronz No. 12"; and dried ground mica sold under the trademark name "Mineralite 3X"; silicas, particularly the product sold under the trademark names "Celite." "Gold Bond R," "Hi Sil 233" and talc, particularly those sold under the trademark names "Nytal 300," and "HGO–55."

Preferred pigments which are found to give good results are the so-called "water-dispersible" grades of pigment. The product known as "Titanox C–50," which is an extended titanium dioxide gives especially good results.

The preferred extender type pigments are clays, micas, silicas and talcs. It is preferable that the dried type be employed, for example, in the case of dried ground mica which is better than the water-ground type. Calcium carbonate while employable is not preferred but "Micro Velva L" which is a mixed product of calcium carbonate, aluminum silicate and magnesium silicate, is preferred. It is preferred when using pigments and/or extenders that these agents not exceed 2 microns average diameter, in order to give a smooth appearance to the film.

Useful cementitious materials are well known and may be selected from the general class of inorganic substances which when mixed with water react to form a solid product characterized by good weathering properties. Examples of suitable reactant materials include Portland cement, hi-early strength Portland cement, sand, lime, plaster of Paris and the like. Where cementitious materials including plaster materials are used, it is preferred to limit the particle size to a screen size of 85–200 mesh, U.S. screen size.

The class of useful texturing agents is understandably a very broad one comprising those inorganic substances which when contained in the film cast from an aqueous dispersion of the dry powdered composition can be characterized as responsible for the texture or grainy appearance of the film. The class of inorganic texturing agents imparts a greater degree of hardness and water insensitivity to the films than does the class of organic texturing agents. Sand and a material containing 55–75% $SiO_2$, the latter sold under the trade name of "Perlite" are the preferred texturing agents because such compositions containing silicon dioxide as the main constituent generally impart a degree of weatherability not found with other inorganic materials. "Perlite" is especially preferred because of its low bulk density which decreases the weight of the dry mixture and in addition serves to increase the insulative characteristics of the applied film therefrom.

The texturing agents are inorganic particulate solids, serving essentially only as inert agents in the dried film composition. They should have a particle size of up to 20 mesh U.S. screen size. Films containing texturing agents above this size have poor light scattering and lose the effect generally desired with a texturing agent. Particles of such size are difficult if not impossible to keep suspended in the dispersion.

There is no critical limitation on the particle size of the inorganic particulate solids generally whereby the settling of overly large particles out of the liquid dispersion would break the reconstituted binder emulsion and thereby coagulate, gel, or otherwise adversely affect the entire composition. Where such particles settle out, the effect would be merely one of soft settling and the dispersion can be returned to a uniform composition merely by hand mixing. This effect is certainly surprising in view of the problems still existing with aqueous pigmented polymer dispersions where the settling effect is generally irreversible. The particle size of the inorganic particulate solid is selected solely for the appearance of the film cast from the liquid dispersion obtained from the present dry compositions.

Where the inorganic particulate solid functions as a texturing agent, it is preferred to limit the particle size to a maximum of 20 mesh, U.S. screen size, for the reason that larger size particles are difficult or impossible to keep suspended in the liquid dispersion for any period of time. Stokes' law applies, however, in that the amount of particle settling will be largely a function of the density as well as the size of the particle.

DISPERSING AGENTS

The function of the dispersing agent in the present compositions is to first wet the pigment and secondly to disperse this pigment in the liquid dispersion. Such dispersing agents are those which are compatible with the resin binder emulsion. Where the dispersing agent is not so compatible, it is likely that the resinous particles in the binder emulsion will be precipitated, coagulated, gelled, or undesirably agglomerated.

The dispersing agent may be selected from the group consisting of cationic, anionic and non-ionic surface active agents. Preferred surface active agents of the cationic type are, for example, tertiary amines, particularly an ethoxylated coco amine in which the active hydrogen atoms have been substituted with $x$ and $y$ molecules of ethylene oxide respectively, $x+y$ being equal to 10. Of the anionics, the following are preferred: sulfosuccinates—for example, the sodium salt of di(2-ethylhexyl) sulfosuccinic acid; alkyl aryl sulfonates—such as sodium dodecylbenzenesulfonate; sodium salts of condensed sulfonic acids; and sodium salts of carboxylated polyelectrolytes. Preferred non-ionic surface active agents are: ethylene fatty acid condensates such as polyethoxylated sorbitan monolaurate and polyethoxylated tall oil containing 50% rosin acids and 12 moles of ethylene oxide; alkyl aryl polyether alcohols such as the polyethoxylated tert-octylphenol and nonylphenol (9–10 moles ethylene oxide); alkyl polyether alcohols such as polyethoxylated trimethylnonyl alcohol (8 moles ethylene oxide); and polyoxyalkylenes such as polyoxypropylene (molecular weight 1501–1800) reacted with 5 to 140 moles ethylene oxide.

THICKENERS

Useful thickeners or stabilizers, as they are sometimes called, can best be defined by their function in the liquid dispersions obtained from the dry powders. The primary function of the thickener in the dispersion is to increase the viscosity of the water phase in the dispersion. This function is distinct from the primary function usually sought for thickeners in liquid polymer dispersion coating compositions. The primary function generally sought is to stabilize the dispersion by preventing the collision of the resin particles with the subsequent result of precipitation. The applicants' liquid dispersions would not so precipitate without the presence of the thickener. The thickening effect is desired solely for the application of the liquid composition. By this it is meant to say that the applicants desire a composition of thicker consistency so as to be able to trowel rather than brush on the coating. Useful thickeners can be selected from the class of hydrophilic colloids generally, but may include finely divided inert particulate solids. For example, preferred thickeners are of the divided silica and borated alginate types, although cellulosics such as carboxymethylcellulose may also be employed. Examples of the types of thickeners which are effective are methyl cellulose, sold under the name "Methocel," carboxymethylcellulose, sold under the brand "CMC, Type 70, LV," hydroxyethylcellulose, sold under the name "Cellosize WP-09," low viscosity, partially hydrolyzed, polyvinyl alcohol, sold under the name "Gelvatol 40-10," borated alginate sold under the name "Burtonite X-90"; guar gum, sold under the name "Burtonite No. 7," methylated guar gum, sold under the name "Burtonite No. 77"; and silica, sold under the name "Hi Sil 233."

The invention will be described in more detail by reference to the following examples which disclose some of its preferred formulations and procedures. The compositions shown are based on weight percent, unless otherwise mentioned.

*Example 1*

The following composition having particular suitability as a dry powder paint was formulated in accordance with the invention:

| | |
|---|---|
| Spray-dried polyvinyl acetate emulsion according to Example 1, Morrison U.S.P. 2,800,463 | 26.3 |
| Plasticizer (dibutyl phthalate) | 4.0 |
| Prime pigment (extended titanium dioxide) | 32.6 |
| Extender (silica "Hi Sil 233") | 14.5 |
| Clay ("ASP 400") | 16.3 |
| Dispersing agent (tertiary amine—"Ethomeen C-15") | 6.3 |
| | 100.0 |

The prime pigments and extenders were thoroughly mixed in a Baker Perkins dough mixer. Then, the dispersing agents were added slowly. The plasticizer was then slowly mixed. Finally when a uniform mixture had been reached, the spray-dried polyvinyl acetate emulsion was slowly sifted into the batch with continued agitation. When the mixture was complete, it was screened to remove any resin which had been agglomerated by the plasticizer.

This powdered composition was dispersed in water by simply hand mixing to 50 weight percent solids. The result was a smooth aqueous dispersion which retained its stability for 6 months. Films laid down from this dispersion by ordinary painting methods, for example with a brush, a roller or a spray, after air drying at room temperature were water resistant, did not shrink or crack, and had good abrasion resistance.

*Example 2*

A powdered caulking compound was prepared according to the method described in Example 1 and having the following composition:

| | |
|---|---|
| Spray-dried free-filming polyvinyl acetate powder | 32.9 |
| Dispersing agent (Tamol 731) | 0.04 |
| Thickener (Burtonite 7) | 0.2 |
| Pigment (Permolith W20) | 19.99 |
| Pigment extender (ASP 400) | 36.9 |
| Plasticizer (Hercoflex 900) | 9.97 |
| | 100.00 |

501 parts of the powder were mixed with 255 parts water at room temperature and with moderate mechanical agitation for 10 minutes. When applied, the mixture formed a tight and sound water-resistant joint between masonry and such other members as window frames, steel sashes, glass bricks, wood frames, and the like. The joint does not shrink or crack and has good elasticity.

*Example 3*

A dry powdered spackling and finishing compound was prepared according to the method described in Example 1 and having the following composition:

| | |
|---|---|
| Spray-dried free filming polyvinyl acetate powder | 3.19 |
| Dispersing agent (Tamol 731) | 0.05 |
| Plasticizer (dibutyl phthalate) | 0.32 |
| Solvent (Hexylene glycol) | 0.24 |
| Thickener (Gelvatol 40-10) | 0.49 |
| Retarder (Malic acid) | 0.04 |
| Pigment extender (talc) | 23.22 |
| Fungicide (PMA15, a product of Nuodex Products Inc.) | 0.03 |
| Plaster of Paris | 72.42 |
| | 100.00 |

The above composition demonstrates the incorporation of optional beneficial additives such as fungicides and retarders. The purpose of the retarder is to prolong the setting time of compositions containing cementitious materials as a result of the usual hydration reaction of the latter materials with water. Useful retarders, in addition to the malic acid used in the above composition, include commercial protein retarder, glue, acetic acid, acid materials generally, and others. Malic acid is especially preferred over other retarders, because it aids in the prevention of solids settling in the aqueous redispersed compositions.

When 3450 parts of the above composition were mixed with 1760 parts of water, the setting time for the wet composition was approximately 4 hours.

*Example 4*

A dry powdered texture finish compound was prepared according to the method described in Example 1 and having the following composition:

| | |
|---|---|
| Binder, Spray-dried S-55 polyvinyl acetate according to Example 2, Morrison U.S.P. 2,800,463 | 47.0 |
| Dispersing agent: Tamol 731 | 0.11 |
| Plasticizer: Dibutyl phthalate | 0.48 |
| Solvent: Hexylene glycol | 0.35 |
| Pigment: Titanox RA50 | 1.05 |
| Pigment extender: Mica, sold under the trade name of "Asbestine 3x" | 4.2 |
| Texturing agents: | |
|    Sand | 38.5 |
|    Perlite | 0.53 |
| Thickener: Burtonite 7 | 0.19 |
| Fungicide: PMA15 | 0.021 |
| Water-proofing agent: | |
|    Calcium stearate | 0.56 |
|    Portland cement | 7.0 |
| | 99.99 |

When 164 parts of the above composition were mixed with 70 parts of water, the film air-dried at room temperature to a smooth, flexible coating which did not crack, was waterproof, and remained unaffected by oxidation and atmospheric conditions for a long period of time.

It is not intended to limit this invention to binders comprising dried emulsions of polyvinyl acetate and internally plasticized polyvinyl acetate merely. Useful binders may be selected from the class of resinous film-forming polymerized vinyl compounds comprising homopolymers of vinyl esters and copolymers thereof, which binders may be generally characterized as having the ability to be prepared in a water dispersible, stable dry powder form, which powder is redispersible on mixing with water alone to form a stable emulsion. Polyvinyl formate is therefore excluded from the class as unstable, since it readily reacts with water to form polyvinyl alcohol. The class of useful binders may be more specifically characterized on the basis of the final film properties which are a function of the resinous binder. The properties possessed by the films of the present invention are non-shrinkage, non-cracking, abrasion-resistance, and water-resistance. Useful solid vinyl ester compounds in addition to the polyvinyl acetate shown in the preceding examples include polymers of vinyl propionate, vinyl butyrate, vinyl-hexoate, vinyl benzoate, and others. Useful vinyl ester copolymers include the copolymers of vinyl acetate with esters of copolymerizable monoethylenically unsaturated dicarboxylic acids such as dibutyl maleate, diethyl fumarate, dioctyl maleate, and the like; copolymers of vinyl acetate with other vinyl esters such as vinyl propionate, vinyl butyrate, vinyl hexoate, vinyl benzoate and the like; copolymers of vinyl acetate with vinyl halides such as vinyl chloride and vinyl bromide; copolymers of vinyl acetate with lower alkyl esters of acrylic acid such as methyl acrylate, propyl acrylate, butyl acrylate, hexyl acrylate, octyl acrylate and the like; copolymers of vinyl acetate with lower alkyl esters of methacrylic acid such as methyl methacrylate, ethyl methacrylate, propyl methacrylate, butyl methacrylate, hexyl methacrylate, octyl methacrylate and the like, copolymers of vinyl acetate with monethylenically unsaturated carboxylic acids such as acrylic acid, methacrylic acid, crotonic acid and the like, etc. The following examples illustrate compositions utilizing resinous binders other than polyvinyl acetate, wherein Example 5 is illustrative of a dry paint and Example 6 represents a dry caulking compound formulation.

Example 5

| | |
|---|---|
| Spray-dried powder binder (copolymer of 75% by weight of the copolymer of vinyl acetate–25% by weight of the copolymer of dibutyl maleate) | 31.6 |
| Pigment (Titanox C–50) | 42.7 |
| Pigment extender (clay, ASP 400) | 21.4 |
| Dispersing agent (Tamol 731) | 0.7 |
| Plasticizer (dibutyl phthalate) | 2.6 |
| Thickener (methylcellulose) | 1.0 |

Example 6

| | |
|---|---|
| Spray-dried polyvinyl butyrate (emulsion prepared according to Example 5, Starck U.S.P. 2,227,163) | 32.9 |
| Dispersing agent | 0.04 |
| Pigment | 19.99 |
| Pigment extender | 37.10 |
| Plasticizer | 9.97 |
| | 100.0 |

It is furthermore not intended to limit the dry resinous binders utilized in the practice of the present invention to those obtained by a spray-drying process such as that shown in U.S.P. 2,800,463. Useful vinyl resin binders in free flowing dry powder form may also be prepared by such methods as the freeze-drying and vacuum-drying methods shown in this same reference and other methods.

What is claimed is:
1. A process for the manufacture of dry, free-flowing, water redispersible powders, comprisng (A) the thorough blending, by means of a dough mixer, of (1) 40 to 1000 parts by weight of an insoluble water dispersible inorganic particulate solid selected from the group consisting of pigments, pigment extenders, Portland cements, plaster of Paris, lime, silicates and mixtures thereof; (2) 0.1 to 5 parts of a surface active agent selected from the group consisting of tertiary amines, sodium salts of sulfosuccinic acids, alkyl aryl sulfonic acids and condensed sulfonic acids, condensates of fatty acids with ethylene oxide, polyethoxylated alkyl and aryl alcohols, and polyoxyalkelene glycols; (3) up to 30% of the particulate inorganic solid weight of a high boiling water dispersible organic liquid selected from the group consisting of glycols, glycol ethers, esters of glycol ethers, phthalate esters, phosphate esters, citrate esters, chlorinated biphenyls, polyesters and mixtures thereof; (4) 0.4 to 25 parts of a hydrophilic colloid thickener selected from the group consisting of borated alginates, methyl cellulose, carboxymethyl cellulose, hydroxyethyl cellulose, guar gum, methylated guar gum and polyvinyl alcohol; and (B) sifting in and thoroughly blending with the resultant mixture, 100 parts of a dried particulate water redispersible polyvinyl ester emulsion wherein the polyvinyl ester is selected from the group consisting of polymers of vinyl esters of organic acids containing from 2 to 7 carbon atoms and copolymers of vinyl acetate with compatible monoethylenically unsaturated monomers.

2. A composition prepared according to the process of claim 1.

3. The process of claim 1 wherein 0.1 to 5 parts by weight of a material selected from the group consisting of malic acid, acetic acid and animal glue, is blended with the mixture before the addition of the polyvinyl ester.

4. A composition prepared according to the process of claim 3.

5. The process of claim 1 wherein the dried polyvinyl ester emulsion employed is a spray dried polyvinyl acetate powder having an apparent density of 30 lbs./cubic foot and a predominant particle size of 2 to 3 microns in diameter.

6. A composition prepared according to the process of claim 5.

7. The process of claim 1 wherein the dried polyvinyl ester emulsion employed is a spray dried copolymer containing 75% by weight of vinyl acetate units and 25% by weight of dibutyl maleate units.

References Cited in the file of this patent

UNITED STATES PATENTS

| | | |
|---|---|---|
| 2,507,688 | Armstrong | May 16, 1950 |
| 2,536,470 | Schoenholz | Jan. 2, 1951 |
| 2,567,678 | Morrison | Sept. 11, 1951 |
| 2,733,995 | Robinson | Feb. 7, 1956 |
| 2,800,463 | Morrison | July 23, 1957 |
| 2,889,297 | Brandner | June 2, 1959 |
| 2,990,382 | Wagner et al. | June 27, 1961 |
| 3,003,979 | Ptasienski et al. | Oct. 10, 1961 |

OTHER REFERENCES

Lea et al.: "The Chemistry of Cement and Concrete," Edward Arnold Ltd. (London), (Revised Edition, 1956) page 446.